UNITED STATES PATENT OFFICE.

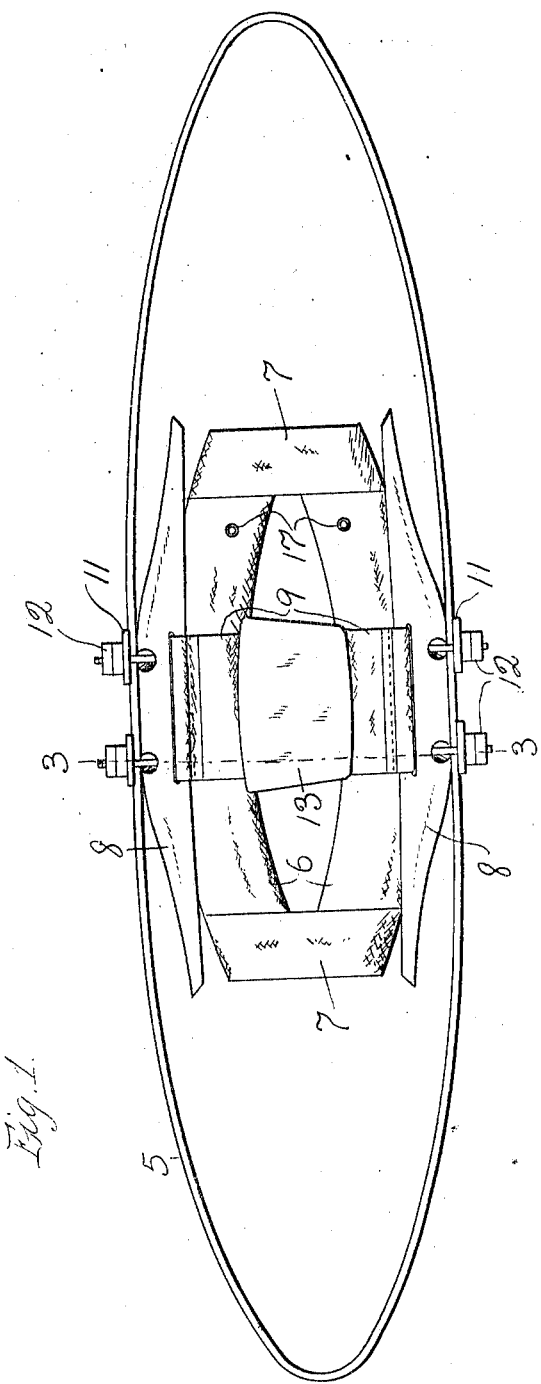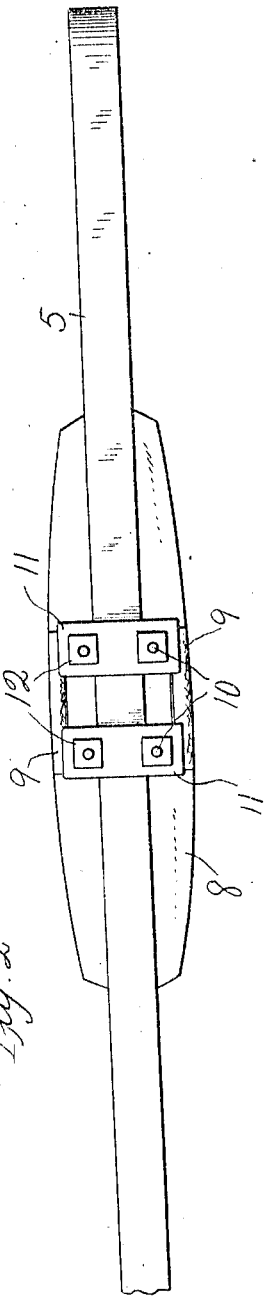

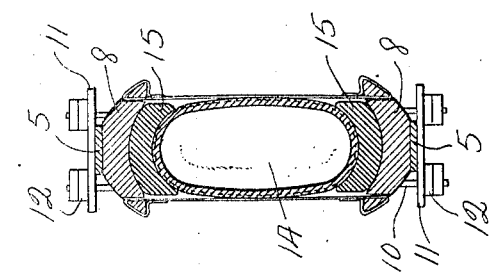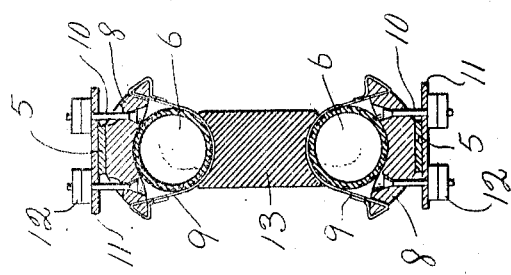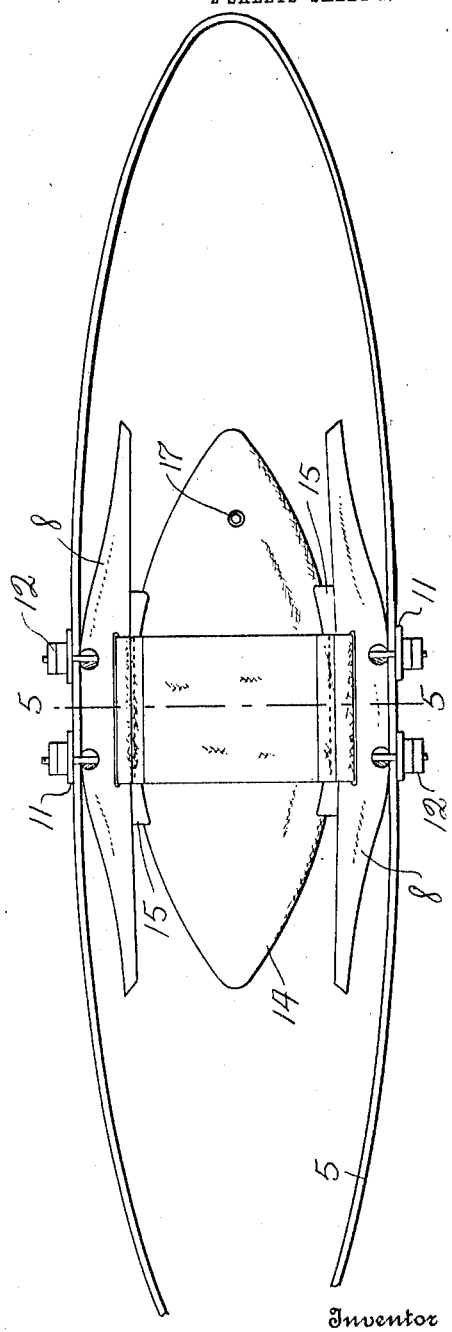

HARRY DODGE, OF PETERSBURG, VIRGINIA.

SHOCK-ABSORBER.

1,096,609.  Specification of Letters Patent.  Patented May 12, 1914.

Application filed October 20, 1913. Serial No. 796,312.

*To all whom it may concern:*

Be it known that I, HARRY DODGE, citizen of the United States, residing at Petersburg, in the county of Dinwiddie and State of Virginia, have invented certain new and useful Improvements in Shock-Absorbers, of which the following is a specification, reference being had to the accompanying drawings.

This invention relates to improvements in shock absorbers for vehicles and has for its primary object to provide a highly efficient, durable and reliable device of this character which will absorb all shocks or jars in traveling over rough roads so that the same will not be transmitted to the vehicle body.

The invention has for another and more specific object to provide a combination vehicle spring and pneumatic cushion support for the vehicle body, said cushion acting to prevent undue compression of the springs and materially assisting in yieldably sustaining the body of the vehicle and thereby greatly conducing to the comfort of the occupants thereof.

My invention has for another of its objects to produce a device of the above character embodying in its construction, spaced tubes connected at their ends, each supplied with a valve, means for mounting said tubes between the opposed portions of an elliptical vehicle spring, and a spacing cushioning block centrally arranged between the tubes.

Another object of the present invention is to generally improve and increase the serviceability of devices for the above purpose without increasing their cost of manufacture to any material extent.

My invention has for a still further object to provide an improved cushioning means for the body of a vehicle whereby the use of pneumatic tires upon the vehicle wheels may be dispensed with, and metal or solid rubber tires may be used, thus eliminating the expense incident to frequent punctures.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a side elevation of a shock absorber for vehicles constructed in accordance with the present invention; Fig. 2 is a top plan view thereof; Fig. 3 is a section taken on the line 3—3 of Fig. 1; Fig. 4 is a side elevation illustrating a slightly modified form of my invention; Fig. 5 is a section taken on the line 5—5 of Fig. 1.

Referring in detail to the drawings, 5 designates an elliptical vehicle spring which is preferably formed of a continuous length of resilient metal. It is to be understood, however, that the essential elements of the present invention are also adaptable to use in connection with the common form of elliptical vehicle spring in which the upper and lower portions of the spring each consists of a plurality of laminated spring plates.

Between the upper and lower portions of the elliptical spring plate 5, my improved pneumatic cushion is arranged. This cushion includes a pair of tubes 6 preferably, though not necessarily, connected at their ends by fabric or other webbing indicated at 7. The tubes themselves are formed of rubber, upon which layers of canvas or duck are vulcanized or otherwise secured, and the whole is incased in an outer covering of cloth. It is, however, also obvious that the specific construction of these tubes may be otherwise than above stated, without affecting the operation of the device.

To the upper and lower portions of the spring 5, elongated longitudinally extending shield plates 8 are secured. These plates are arranged between the longitudinal portions of the spring and their opposed faces are concave to provide seats for the oppositely bowed tubes 6. Each of the tubes is centrally connected by the flexible straps 9 to one of said shield plates at the opposite edges thereof. 10 designates a plurality of bolts extending through openings provided in each of the shield plates. These bolts are arranged in pairs and are connected by means of the clip plates 11 extending transversely of the spring 5, suitable nuts 12 being threaded upon the ends of the bolts to securely clamp the shield plates in position.

A block 13 of rubber or other yieldable material is arranged between the cushioning tubes 6. This rubber block is slightly tapered as shown, the upper portion thereof being somewhat longer than the lower portion. The upper and lower faces of the block are of concave formation to closely engage with the tubes 6 and provide seats therefor.

In Fig. 4 of the drawings, I have disclosed a slightly different form of my invention wherein only a single tube 14 is employed. This tube is of torpedo shape or tapers from its central portion to its ends as clearly shown in the drawing, and rubber cushioning blocks or pads 15 are arranged centrally between this tube and the spaced shield plates which are secured upon the upper and lower portions of the vehicle spring. In both forms of the cushion, the tubes are provided with suitable valves, indicated at 17, whereby the same may be supplied with air, gas, water or other cushioning medium.

In the practical operation of my invention, it will be apparent that after the vehicle spring has been secured to the axle and vehicle body in any ordinary or approved manner, the cushioning tubes will serve in conjunction with the springs to absorb all shock or jar which might otherwise be imparted to the body of the vehicle in traveling over rough roads. The single tube form of my improved cushion is especially designed for use upon light vehicles such as buggies and carriages while the double tube construction is more especially adapted for use in connection with heavy commercial vehicles.

From the foregoing description taken in connection with the accompanying drawings, the construction and operation of my invention will be fully and clearly understood. The device is extremely simple in construction, highly serviceable and efficient in practical use and may be produced in either of the above disclosed forms at comparatively small manufacturing cost. It will be appreciated that by using my improved cushion in connection with the ordinary vehicle spring, a highly serviceable and desirable device which will completely absorb all shocks or jars is produced. It will be understood that in the practical development of the invention, the form and manner of mounting the shield plates for the cushioning tubes may be varied in many respects. Various other modifications may also be made in the form, construction and arrangement of the several elements employed and I therefore reserve the right to resort to all such legitimate changes as may be fairly embodied within the spirit and scope of the invention, as claimed.

Having thus described the invention, what is claimed is:

1. In a shock absorber, the combination with an elliptical vehicle spring, of a cushion including a central yieldable cushioning member, additional cushioning members arranged above and below said central member and engaged thereupon, and means secured to the opposite central portions of the elliptical spring and engaged upon said latter members to retain the cushion in place.

2. In a shock absorber, the combination with an elliptical spring, of a cushion, including spaced yieldable cushioning members, an additional cushioning member arranged between said first named members and yieldingly holding the same against relative movement, retaining plates removably mounted upon the opposite intermediate portions of the elliptical spring and engaged upon said first named members, and flexible elements secured at their ends to said plates and disposed upon opposite sides of said first named cushioning members to prevent movement of the same with respect to said additional cushioning members.

3. In a shock absorber, the combination with an elliptical vehicle spring, of a cushion embodying a pair of tubular members adapted to be supplied with a suitable cushioning medium, a resilient spacing block arranged between said members, and means for retaining said members in position between the opposed portions of the elliptical spring.

4. In a shock absorber, the combination with an elliptical vehicle spring, of a pair of tubular cushioning members adapted to be supplied with a suitable cushioning medium, shield plates secured to the opposed portions of the elliptical spring between which said members are arranged, and means centrally arranged between said cushioning members to space the same.

5. In a shock absorber, the combination with an elliptical vehicle spring, of a pair of tubular cushioning members, means flexibly connecting said members at their ends, each of said members being provided with a valve whereby the same may be supplied with a suitable cushioning medium, means for retaining said members in position between the opposed portions of the elliptical spring, and a resilient spacing block arranged centrally between said members.

6. In a shock absorber, the combination with an elliptical vehicle spring, of a pair of tubular cushioning members, means flexibly connecting said members together at their ends, shield plates secured to the opposed portions of the elliptical spring and providing seats for the respective tubular members, and a resilient spacing block centrally arranged between said tubular members.

7. In a shock absorber, the combination with an elliptical vehicle spring, of elongated longitudinally extending shield plates secured to the opposed portions of said spring, a pair of tubular members substantially co-extensive in length with said plates, flexible connections between said members and the respective shield plates, each of said members being provided with a valve whereby the same may be supplied with a suitable cushioning medium, and a resilient spacing block centrally arranged between said tubular members.

In testimony whereof I hereunto affix my signature in the presence of two witnesses.

HARRY DODGE.

Witnesses:
ROBERT G. BASS,
ROBT. L. LEAFORD.